May 9, 1933.   I. YASSENOFF   1,908,208
METHOD OF MAKING CUTTING TOOLS
Original Filed Dec. 4, 1929
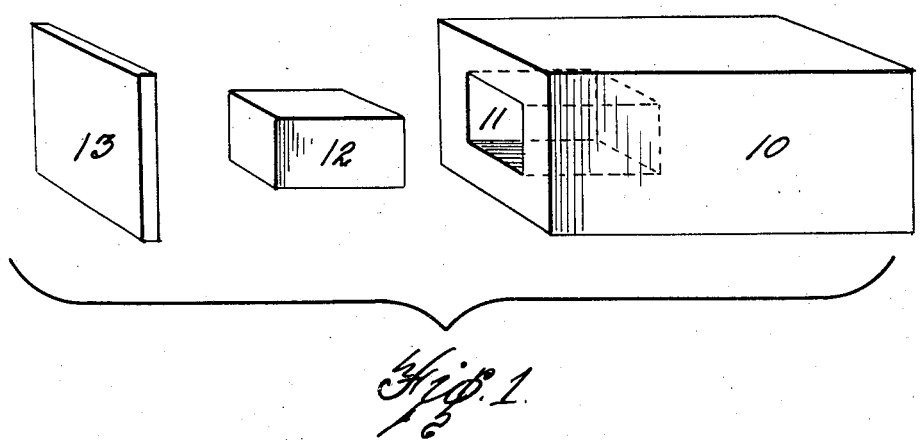
Fig. 1.
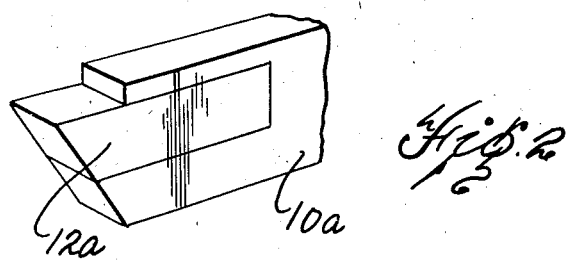
Fig. 2.
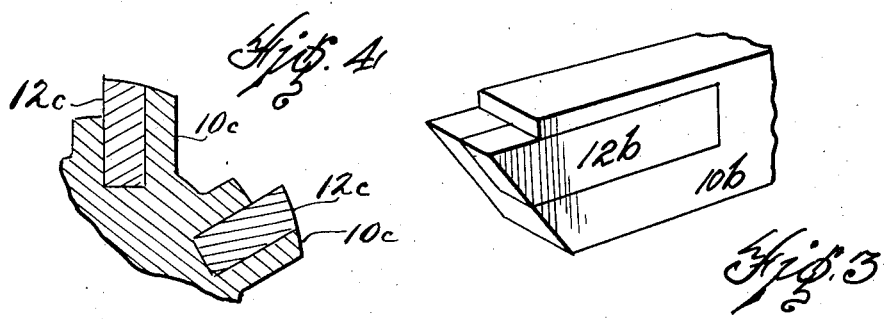
Fig. 4.
Fig. 3.
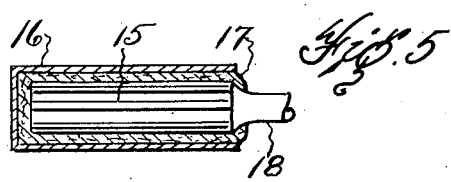
Fig. 5.
INVENTOR.
Isidor Yassenoff.
BY Francis D Hardesty
ATTORNEY.

Patented May 9, 1933

1,908,208

UNITED STATES PATENT OFFICE

ISIDOR YASSENOFF, OF DETROIT, MICHIGAN

METHOD OF MAKING CUTTING TOOLS

Application filed December 4, 1929, Serial No. 411,597. Renewed September 28, 1932.

The present invention relates to cutting tools and more especially to cutting tools having a body portion of steel with a cutting edge portion of another material and to processes of making such tools.

A material recently introduced into industrial use for cutting tools for working metals, is a material known by various trade names, such as "Carballoy" and others, and consisting of tungsten carbide. This material is extremely hard and holds its edge in high speed operations but is expensive and difficult to work.

Attempts have been made to fix small pieces of the material to bodies of steel but heretofore such attempts have been unsatisfactory owing to several conditions. Operations of fixing together the two materials involving the use of heat seem to modify the properties of the carbide material unless conducted in special furnaces of expensive construction and operation and mechanical holding means involve too much waste.

Among the objects of the present invention is to overcome the difficulties heretofore encountered and provide a process of fixing the carbide edge piece into a steel body which shall be simple and inexpensive.

Another object is a tool blank so produced which when formed into a tool, shall be long lived and which will result in very little waste of the expensive carbide material in the used up tool.

Other objects will readily occur to those skilled in the art upon reference to the following description and the accompanying drawing in which:—

Fig. 1 is a perspective view of the body, insert and cover piece illustrating the method of forming the tool blank.

Fig. 2 is a perspective view of one form of finished tool.

Fig. 3 is a similar view of another form of tool.

Fig. 4 is a section through a reamer as made by the present process.

Fig. 5 is a section showing the method of protecting the reamer during the heating and cooling.

In carrying out the present method, a body member 10 of a suitable kind of metal, such as any suitable steel, of approximately the size of the desired tool, is first provided with a recess 11, of such size as to receive with a fairly close fit a piece 12 of the carbide material. The latter is then placed in the recess with brazing metal completely covering the sides adjacent the walls of the recess. After the insert is in place, the outer face is covered against access of air by placing thereover the plate 13 with luting material such as fireclay therebetween.

The plate 13 is then fixed in position by any suitable means such as clamping or by screws, or by any other suitable means, and the assembly placed in a suitable furnace and heated to a brazing temperature.

When the brazed assembly has been cooled, it may then be ground to expose sufficient of the carbide material for the particular tool to be obtained, leaving the insert brazed to the body metal on its under face, its back face and a large portion of its upper face.

In the case of the tool of Fig. 3, one of the side faces is also brazed to the body. In Figs. 2 and 3 the body 10a or 10b is shown as having been ground off with the insert 12a being exposed on the side and front, the insert 12 being exposed on both sides. At the top face the body has been removed only for a portion of the length of the insert so that the latter is supported on three faces and is therefore free from the possibility of becoming loosened due to vibration in use.

Instead of using a plate 13 with luting material the latter alone will function to protect the carbide material where there is no probability of its becoming dislodged mechanically.

In Fig. 5 is shown the method of treating reamers. In this figure the reamer body with the inset edge pieces is shown at 15. This body is enclosed in a cap 16 within which the luting material 17 covers the entire tool, excepting the shank 18.

Fig. 4 shows a section of the reamer with the cutting pieces at 12c secured on the three faces to the body metal 10c.

Now, having described the invention and the preferred forms of embodiment thereof, it is to be understood that the said invention is to be limited, not to the specific details herein set forth but only by the scope of the claims which follow.

I claim:—

1. The process of producing metal cutting tools which comprises forming a body of suitable workable metal, providing an enclosing recess therein, placing in said recess an insert of tungsten carbide with brazing metal interposed between said carbide and the recess walls, hermetically sealing said insert in said recess, and heating the assembly to a brazing temperature and finally removing sufficient of the sealing medium and body material to expose a sufficient portion of said insert for a cutting edge.

2. The process of producing metal cutting tools which comprises forming a body of suitable workable metal, providing an enclosing recess therein, placing in said recess an insert of tungsten carbide with brazing metal interposed between said carbide and the recess walls, coating all exposed surfaces of said insert with an hermetically sealing material not affected by heat, such as fire clay, to seal said insert hermetically in said recess, and heating the assembly to a brazing temperature and finally removing sufficient of the sealing medium and body material to expose a sufficient portion of said insert for a cutting edge.

ISIDOR YASSENOFF.